Dec. 12, 1950     J. REMONTE     2,533,691
LAWN MOWER CUTTING REEL
Filed Aug. 11, 1947     2 Sheets—Sheet 2
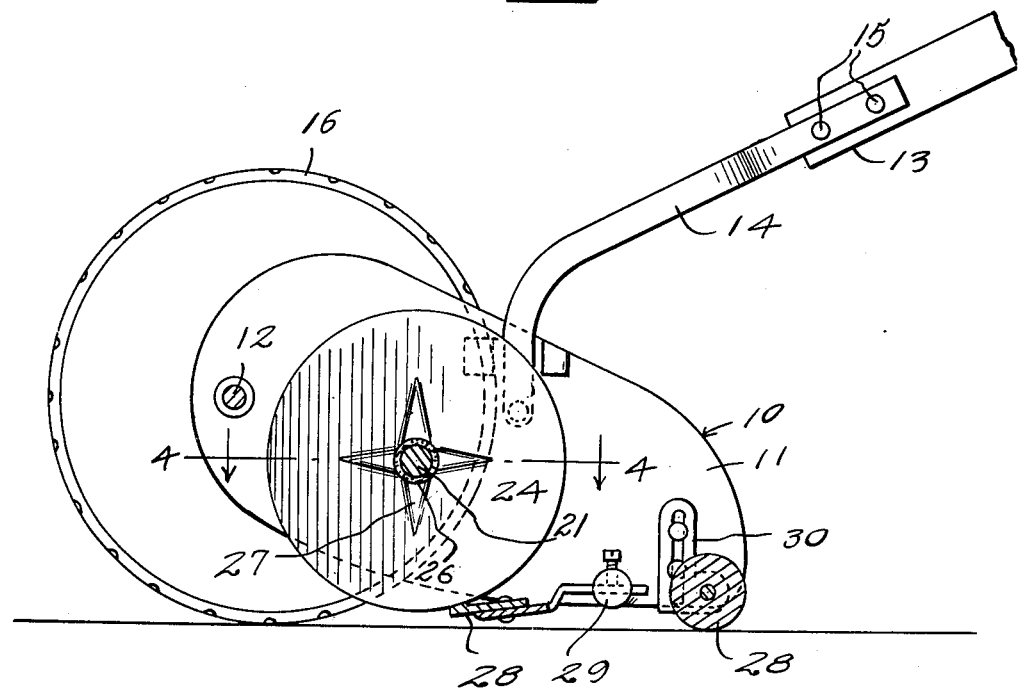
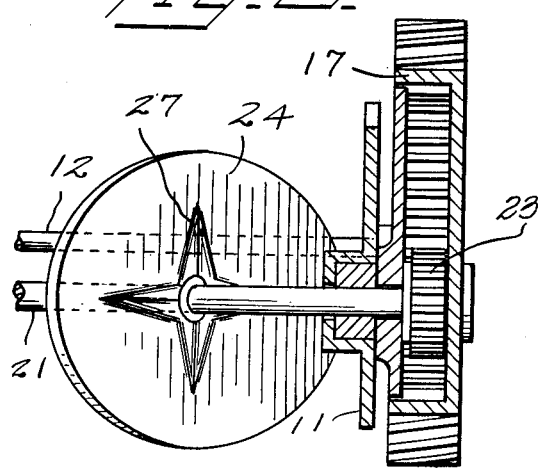 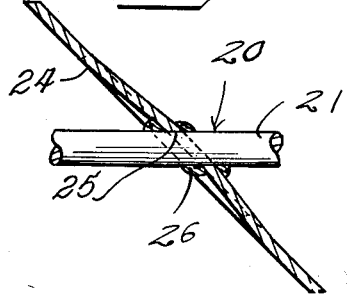
Inventor
John Remonte
By Kimmel & Crowell
Attorneys Patented Dec. 12, 1950

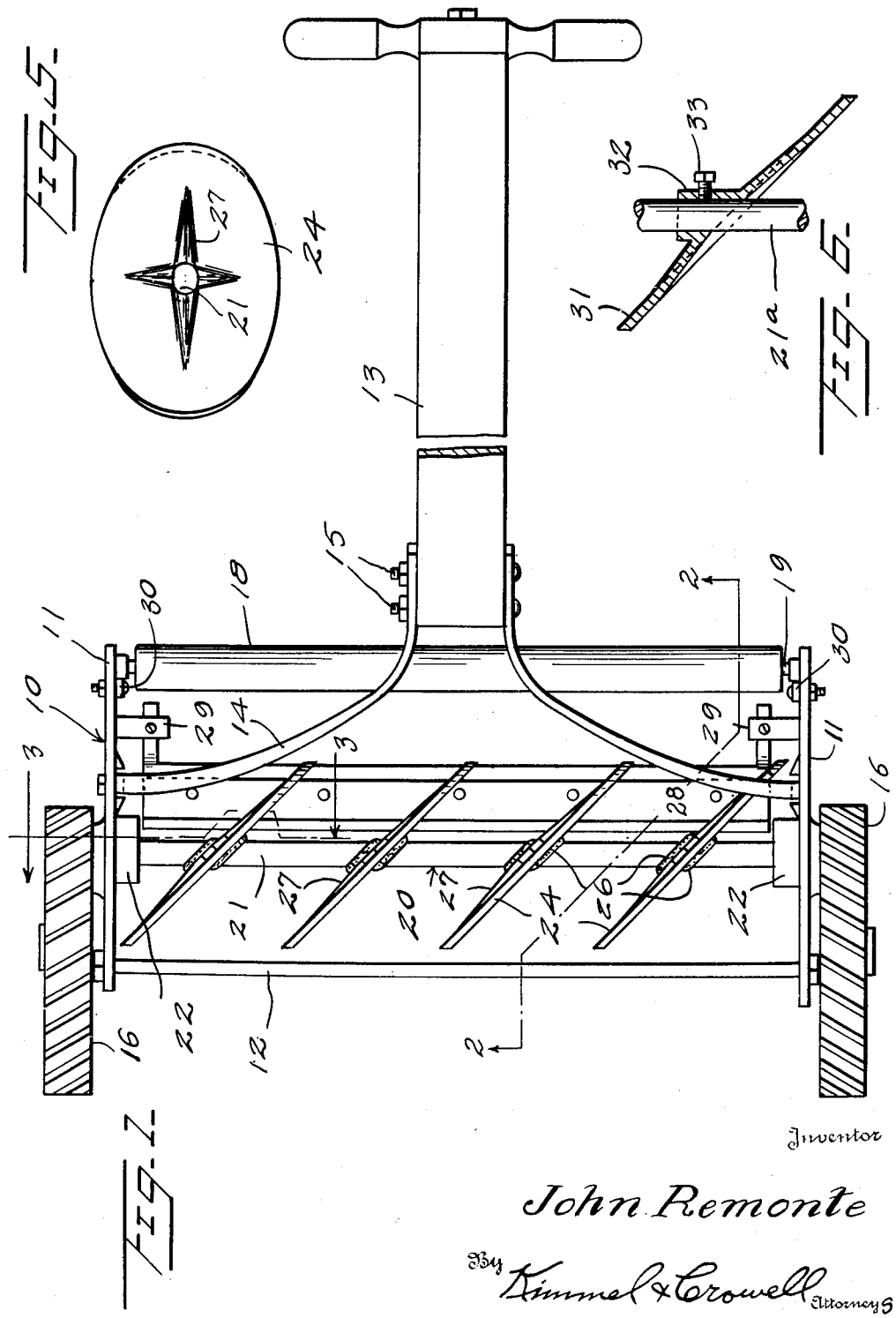

2,533,691

UNITED STATES PATENT OFFICE 2,533,691

LAWN MOWER CUTTING REEL

John Remonte, Corsicana, Tex., assignor of one-half to Charles F. Dominy, Fort Worth, Tex.

Application August 11, 1947, Serial No. 767,997

2 Claims. (Cl. 56—249)

This invention relates to lawnmowers, and more particularly to an improved cutting reel for a lawnmower.

An object of this invention is to provide in a lawnmower, a cutting reel which is formed with a shaft and plurality of angularly disposed cutting discs mounted on the shaft.

Another object of this invention is to provide a cutting reel for a lawnmower which includes a plurality of spaced discs which are fixed in parallel relation to a shaft, being disposed on an angle relative to the length of the shaft. In one form of the invention each disc is formed with a bushing which is secured to the shaft by means of a set screw, whereas in another form of the invention, the discs are secured to the shaft by welding.

A further object of this invention is to provide a cutting reel of this kind which will produce a smooth cutting action, with the rotary cutters always in contact with the stationary blade, thereby eliminating the chatter which is present in conventional spiral bladed reels.

With the above and other objects in view, my invention consists in the arrangement, combination and details of construction disclosed in the drawings and specification, and then more particularly pointed out in the appended claims.

In the drawings,

Figure 1 is a detail plan view, partly broken away and in section, of a lawnmower constructed according to an embodiment of this invention, Figure 2 is a fragmentary vertical section through the device on line 2—2 of Figure 1, Figure 3 is a fragmentary sectional view taken on the line 3—3 of Figure 1, Figure 4 is a fragmentary sectional view taken on the line 4—4 of Figure 2, Figure 5 is a detail end elevation of the cutting reel, Figure 6 is a fragmentary sectional view through a modified form of the cutter.

Referring to the drawings, the numeral 10 designates generally a frame which is formed of a pair of side members 11 connected together at their forward position by means of a connecting bar 12.

A handle 13 is loosely connected between the side frame members 11 by means of longitudinally bent bars 14 which are secured by fastening means 15 to the handle 13. The side members 11 have journaled thereon traction wheels 16 which are formed with an annular inner gear 17 constituting the driving means for the cutting reel. A roller 18 is rotatably disposed between the rear ends of the side members 11, being mounted on trunnions 19 which are carried by vertically adjustable brackets 30.

A cutting reel generally designated as 20 is rotatably disposed between the two side members 11 and includes a shaft 21 which is journaled in bearing bosses 22 carried by the side members 11. A gear or pinion 23 is mounted on each end of the shaft 21 and it will be understood that the gear 23 has a one-way clutch or coupling for connecting the gear 23 with the shaft 21. This one-way clutch is of conventional construction and is not shown in the drawings.

The reel 20 also includes a plurality of parallel cutter discs 24 which are fixed on the shaft 21. The cutter discs 24 are disposed on an oblique angle relative to the longitudinal axis of the shaft 21 and in the preferred form of this invention, the cutter discs 24 are initially formed with a central opening 25 through which the shaft 21 extends, and welding 26 firmly and fixedly secures each disc 24 to the shaft 21.

The disc 24 is also provided with star-shaped bracing means 27 which is formed by pressing a portion of the central part of each disc outwardly from one side thereof so as to thereby provide outwardly tapering bracing means integral with each disc. The discs 24 are contacted by a stationary cutter bar 28 which is adjustably carried by supporting lugs 29 projecting inwardly from the side members 11 for horizontal movement. The points of contact between the forward edge of the cutter bar 28 and the discs 24 are disposed to the rear and below the axis of rotation of the disc carrying shaft 21. This specific engagement, best seen in Figure 2, coacts with the horizontal adjustment of the cutter bar 28 for continuous contact of the cutting elements without regard to the wear incurred thereby.

Referring now to Figure 6, there is disclosed a modified form of cutter which includes a circular disc or plate 31 formed with a bushing or boss 32 extending from at least one side thereof. A set screw 33 is threaded through the bushing 32 for tightly securing the cutter disc 31 on the reel shaft 21a.

It will be understood that there could be as many cutter discs on the shaft 21 as may be desired, depending on the width of the cut which is to be made.

When the wheels 16 roll over the grass, the grass will be laterally bent and forced by the rotating blades 24 against the stationary cutter 28, and the grass blades will then be cut between the rotary and stationary cutter members.

With a reel as hereinbefore described, the usual clatter or noise caused by contact between the spiral blades of conventiional lawnmowers will be eliminated and the rotary cutters herein disclosed in the form of obliquely inclined discs will at all times be in contact with, or in close proximity to, the cutter bar of the mower.

It is well known that in lawnmowers using spiral blades, both the reel and the stationary cutter bar frequently get out of line so that the leading ends of the spiral blades have a tendency to forcibly strike the stationary cutter bar, and the normal wear between the spiral blades and the stationary cutter bar appears to occur between the ends of the spiral blades and the stationary cutter bar rather than uniformly as to the rotary reel and the stationary cutter bar.

With a mower as hereinbefore described, the reel is in substantially constant contact with the stationary cutter bar so that there will be uniform contact and wear between the reel and the stationary cutter bar.

I do not mean to confine myself to the exact details of construction herein disclosed, but claim all variations falling within the purview of the appended claims.

What I claim is—

1. A lawnmower comprising a pair of side members, a traction wheel journalled in each of said side members and having an annular inner gear formed thereon, a rotary cutting reel journalled between said side members and to the rear of said traction wheels, said cutting reel including a shaft, a plurality of obliquely disposed elliptical cutter discs fixed to said shaft, and a spur gear fixed to each of the opposite ends of said shaft and engaging the inner gear on the adjacent one of said traction wheels, a stationary cutter blade disposed behind and below said shaft and having a straight edge extending forwardly contacting the peripheral edges of said cutter discs to the rear of the lowest points thereof, cutter blade mounting means on said side members adjustably mounting said cutter blade therebetween for movement in a horizontal direction whereby said cutter blade may be moved forwardly to maintain contact with said cutter discs, and a roller disposed to the rear of said cutter blade journalled between said side members and vertically adjustable relative thereto.

2. A lawnmower comprising a pair of side members, a rotary cutting reel between said side members including a shaft journalled in said side members, and a plurality of obliquely disposed elliptical cutter discs fixed to said shaft, driving means carried by said side members and engaging the ends of said shaft for rotating said cutting reel, an inwardly extending lug carried by each of said side members and formed with a horizontal bore extending therethrough, an elongated horizontally disposed cutting bar having a cutting edge along the front thereof and a pair of rearwardly extending supporting arms at the opposite ends thereof, said arms being slidably received within said horizontal bores, and means carried by said lugs locking said arms therein, said cutting edge engaging the peripheral edges of said cutter discs below and to the rear of the longitudinal axis of said shaft whereby wear of said cutter discs and said cutter bar may be compensated for by adjusting the latter forwardly.

JOHN REMONTE.

REFERENCES CITED

The following references are of record in the file of this patent:

UNITED STATES PATENTS

| Number | Name | Date |
| --- | --- | --- |
| 128,759 | Shaw et al. | July 9, 1872 |
| 957,468 | Lynch | May 10, 1910 |
| 2,282,238 | Newton | May 5, 1942 |